United States Patent
Tzeng et al.

(10) Patent No.: US 10,476,263 B2
(45) Date of Patent: Nov. 12, 2019

(54) DEVICE AND OPERATION METHOD FOR ELECTROSTATIC DISCHARGE PROTECTION

(71) Applicant: Novatek Microelectronics Corp., Hsinchu (TW)

(72) Inventors: Tzu-Chien Tzeng, Hsinchu (TW); Jie-Ting Chen, Yilan County (TW); Chun-Yu Lin, Hsinchu (TW); Ming-Dou Ker, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 368 days.

(21) Appl. No.: 14/985,462

(22) Filed: Dec. 31, 2015

(65) Prior Publication Data

US 2017/0194786 A1    Jul. 6, 2017

(51) Int. Cl.
*H02H 9/04*     (2006.01)

(52) U.S. Cl.
CPC ............ *H02H 9/041* (2013.01); *H02H 9/046* (2013.01)

(58) Field of Classification Search
CPC ............ H01L 27/0248; H01L 27/0266; H01L 27/0251; H01L 27/0255; H01L 27/0262; H01L 23/5222; H01L 23/66; H01L 27/0814; H01L 29/6609; H01L 29/7412; H01L 29/861; H01L 29/87; H01L 2924/00; H01L 2924/12032; H01L 2924/13034; H01L 2924/30105; H02H 9/046; H02H 9/041; H02H 9/04
See application file for complete search history.

(56) References Cited

U.S. PATENT DOCUMENTS

| 5,400,202 A | 3/1995 | Metz et al. |
| 5,994,760 A | 11/1999 | Duclos |

(Continued)

FOREIGN PATENT DOCUMENTS

| CN | 1414678 | 4/2003 |
| CN | 1913704 | 2/2007 |

(Continued)

OTHER PUBLICATIONS

Ker et al., "ESD protection design for 900-MHz RF receiver with 8-kV HBM ESD robustness," IEEE Radio Frequency Integrated Circuits Symposioum, Jun. 17-19, 2002, pp. 427-430.

(Continued)

*Primary Examiner* — Thienvu V Tran
*Assistant Examiner* — Nicolas Bellido
(74) *Attorney, Agent, or Firm* — JCIPRNET

(57) ABSTRACT

An electrostatic discharge (ESD) protection device and an operation method of the ESD protection device are provided. The ESD protection device includes an ESD current rail, an ESD protection element string, and a bias circuit. A first end and a second end of the ESD protection element string are electrically connected to the ESD current rail and a signal pad, respectively. The ESD protection element string includes a first ESD protection element and a second ESD protection element that are serially connected. The bias circuit is electrically connected to the ESD protection element string to provide a bias voltage to a common connection node between the first ESD protection element and the second ESD protection element.

33 Claims, 13 Drawing Sheets

(56) References Cited

U.S. PATENT DOCUMENTS

| | | | |
|---|---|---|---|
| 6,414,830 B1 | 7/2002 | Yu | |
| 6,426,854 B1* | 7/2002 | Allen | H03K 19/00315 327/321 |
| 7,285,458 B2 | 10/2007 | Manna et al. | |
| 7,315,438 B2* | 1/2008 | Hargrove | H01L 27/0255 361/56 |
| 7,505,238 B2 | 3/2009 | Woo et al. | |
| 7,589,944 B2 | 9/2009 | Mergens et al. | |
| 8,427,796 B2 | 4/2013 | Worley et al. | |
| 8,873,210 B2 | 10/2014 | Pierco et al. | |
| 2002/0122280 A1* | 9/2002 | Ker | H01L 27/0262 361/56 |
| 2003/0076636 A1* | 4/2003 | Ker | H01L 27/0262 361/56 |
| 2004/0252426 A1* | 12/2004 | Hargrove | H01L 27/0255 361/56 |
| 2005/0057866 A1 | 3/2005 | Mergens et al. | |
| 2005/0134384 A1* | 6/2005 | Sato | H03F 1/30 330/277 |
| 2007/0267701 A1* | 11/2007 | Sung | H01L 27/0266 257/365 |
| 2008/0123230 A1* | 5/2008 | Yun | H02H 9/046 361/56 |
| 2011/0176245 A1 | 7/2011 | Worley et al. | |
| 2013/0063846 A1 | 3/2013 | Pierco et al. | |
| 2014/0160607 A1* | 6/2014 | Reimann | H02H 9/046 361/56 |
| 2015/0228770 A1* | 8/2015 | Lin | H01L 29/87 257/173 |

FOREIGN PATENT DOCUMENTS

| | | |
|---|---|---|
| CN | 101019292 | 8/2007 |
| CN | 102754335 | 10/2012 |
| CN | 103944155 | 7/2014 |
| CN | 105071365 | 11/2015 |
| JP | H05335485 | 12/1993 |
| JP | H0653407 | 2/1994 |
| JP | H10242391 | 9/1998 |
| JP | H11317532 | 11/1999 |
| JP | 2005005705 | 1/2005 |
| JP | 2013062502 | 4/2013 |
| TW | I495217 | 8/2015 |

OTHER PUBLICATIONS

Lin et al., "Improving ESD robustness of stacked diodes with embedded SCR for RF applications in 65-nm CMOS," IEEE International Reliability Physics Symposium, Jun. 1-5, 2014, pp. EL.1.1-EL.1.4.

"Office Action of Taiwan Counterpart Application", dated Nov. 11, 2016, p. 1-p. 9, in which the listed references were cited.

Office Action of China Counterpart Application, dated Aug. 31, 2018, pp. 1-10.

* cited by examiner

DEVICE AND OPERATION METHOD FOR ELECTROSTATIC DISCHARGE PROTECTION

FIELD OF THE DISCLOSURE

The disclosure relates to an electrostatic discharge (ESD) protection circuit, and more particularly, to an ESD protection device with the high-frequency circuit design and an operation method of the ESD protection device.

DESCRIPTION OF RELATED ART

To preclude the internal circuit of an integrated circuit from being damaged by an electrostatic discharge (ESD) current, an ESD protection device capable of instantly transmitting a significant amount of ESD current is required to be arranged between a power rail and a signal pad. When an ESD positive pulse arrives at the signal pad, the ESD protection device is able to timely guide the ESD current of the signal pad to the power rail. By contrast, when an ESD negative pulse arrives at the signal pad, the ESD protection device is able to transmit the current from the power and/or ground rail to the signal pad.

The ESD protection devices have parasitic capacitance. While the ESD protection device is applied to low-frequency circuits, the parasitic capacitance of the ESD protection device may be tolerated. However, while the ESD protection device is applied to the high-frequency circuits, the parasitic capacitance of the ESD protection device may pose an impact on the high-frequency signals of the signal pad and thus may affect the signal integrity. Hence, how to reduce the capacitance of the parasitic capacitor of the ESD protection device without compromising the ESD protection capability is one of the issues to be resolved in the pertinent field.

SUMMARY OF THE DISCLOSURE

The disclosure is directed to an electrostatic discharge (ESD) protection device and an operation method thereof, so as to reduce the parasitic capacitance of an ESD protection element string.

In an embodiment of the disclosure, an ESD protection device that includes a first ESD current rail, a first ESD protection element string, and a first bias circuit is provided. A first end and a second end of the first ESD protection element string are electrically connected to the first ESD current rail and a signal pad, respectively. The first ESD protection element string includes a first ESD protection element and a second ESD protection element that are serially connected. The first bias circuit is electrically connected to the first ESD protection element string to provide a first bias voltage to a first common connection node between the first ESD protection element and the second ESD protection element.

In an embodiment of the disclosure, an operation method of an ESD protection device is provided, and the operation method includes following steps. A first ESD current rail and a first ESD protection element string are provided, wherein a first end and a second end of the first ESD protection element string are electrically connected to the first ESD current rail and a signal pad, respectively. The first ESD protection element string includes a first ESD protection element and a second ESD protection element serially connected to each other. A first bias circuit provides a first bias voltage to a first common connection node between the first ESD protection element and the second ESD protection element.

In an embodiment of the disclosure, an ESD protection device that includes a first ESD current rail, a first ESD protection element string, and a first bias circuit is provided. A first end and a second end of the first ESD protection element string are electrically connected to the first ESD current rail and a signal pad, respectively. The first ESD protection element string includes a first silicon controlled rectifier (SCR) and a second SCR that are serially connected. The first bias circuit is electrically connected to a gate of the first SCR to provide a first bias voltage.

In an embodiment of the disclosure, an operation method of an ESD protection device is provided. The operation method includes following steps. A first ESD current rail and a first ESD protection element string are provided, wherein a first end and a second end of the first ESD protection element string are electrically connected to the first ESD current rail and a signal pad, respectively. The first ESD protection element string includes a first SCR and a second SCR serially connected to each other. A first bias circuit provides a first bias voltage to a gate of the first SCR.

In view of the above, in the embodiments of the disclosure, the ESD protection device and the operation method thereof allow an increase in the voltage drop of at least one ESD protection element in the ESD protection element string (i.e., the voltage difference between two ends of the at least one ESD protection element). The greater the voltage drop of the ESD protection element, the smaller the capacitance of the parasitic capacitor of the ESD protection element. Hence, as provided in the embodiments of the disclosure, the ESD protection device and the operation method thereof may be applied to reduce the capacitance of the parasitic capacitor of the ESD protection element string.

Several exemplary embodiments accompanied with figures are described in detail below to describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
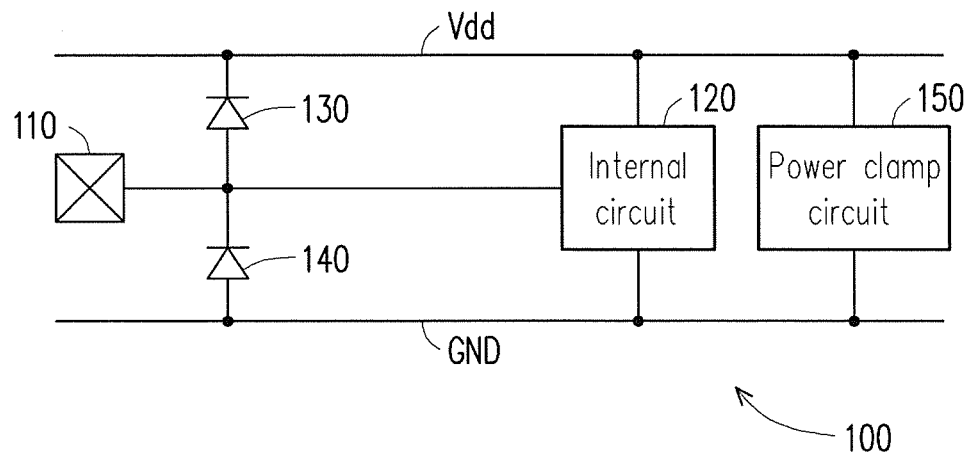
FIG. 1 is a schematic block circuit diagram of a conventional integrated circuit.

The term "coupled (or connected)" used in this disclosure (including claims) may express any direct or indirect connection means. For instance, "a first apparatus is coupled (or connected) to a second apparatus" should be interpreted as "the first apparatus is directly connected to the second apparatus" or "the first apparatus is indirectly connected to the second apparatus through other apparatuses or connection means." Moreover, wherever appropriate, elements/components/steps with the same reference numerals in the drawings and embodiments represent the same or similar parts. Elements/components/steps with the same reference numerals or names in different embodiments may be cross-referenced.

FIG. 1 is a schematic block circuit diagram of a conventional integrated circuit 100. The integrated circuit 100 includes a signal pad 110, an internal circuit 120, a diode 130, a diode 140, a supply voltage rail Vdd, a ground voltage rail GND, and a power clamp circuit 150. The signal pad 110 is coupled to the internal circuit 120. The internal circuit 120 stands for a core circuit and/or a functional circuit of the integrated circuit 100. The cathode of the diode (i.e., the ESD protection element) is electrically connected to the supply voltage rail Vdd. The anode of the diode 130 is electrically connected to the signal pad 110. The cathode of the diode 140 (i.e., the ESD protection element) is electrically connected to the signal pad 110. The anode of the diode 140 is electrically connected to the ground voltage rail GND. The power clamp circuit 150 is electrically connected between the supply voltage rail Vdd and the ground voltage rail GND. Since the power clamp circuit 150 may be a conventional ESD clamp circuit, no explanation will be further provided hereinafter.

When an ESD positive pulse arrives at the signal pad 110, the ESD current may be guided to the supply voltage rail Vdd through the diode 130; alternatively, the ESD current may be guided to the ground voltage rail GND through the diode 130, the supply voltage rail Vdd, and the power clamp circuit 150. When an ESD negative pulse arrives at the signal pad 110, the ESD current may be guided to the signal pad 110 from the ground voltage rail GND through the diode 140; alternatively, the ESD current may be guided to the signal pad 110 from the supply voltage rail Vdd through the power clamp 150, the ground voltage rail GND, and the diode 140. Thereby, the internal circuit 120 may be protected from being burnt down by the ESD current. The FIG. 1 has been described above with reference to "ESD protection design for 900-MHz RF receiver with 8-kV HBM ESD robustness" (M.-D. Ker, W.-Y. Lo, C.-M. Lee, C.-P. Chen, and H.-S. Kao, in IEEE Radio Frequency Integrated Circuits Symp. Dig., 2002, pp. 427-430).

Figure 2:
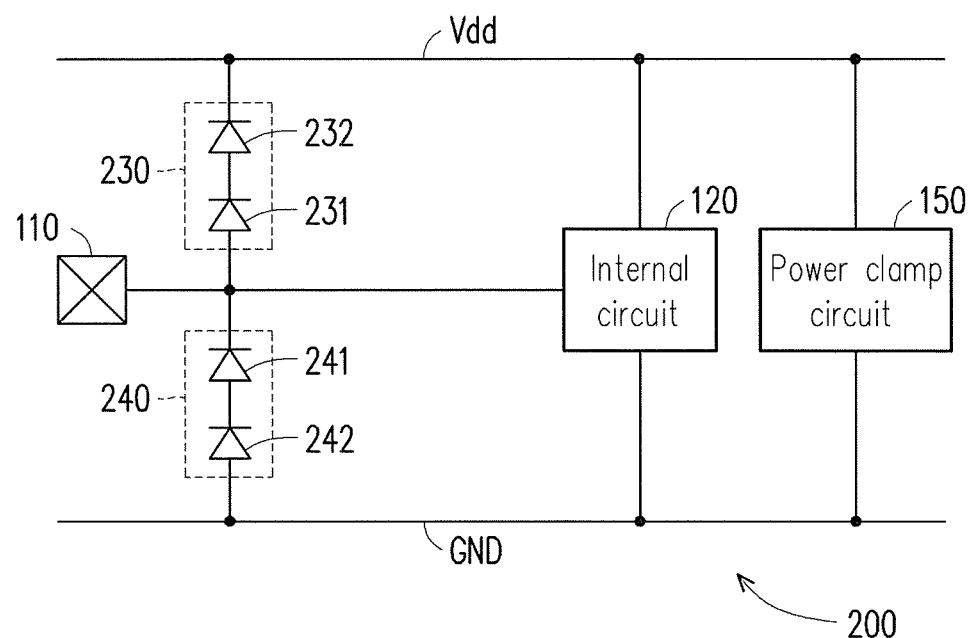
FIG. 2 is a schematic block circuit diagram of another conventional integrated circuit.

FIG. 2 is a schematic block circuit diagram of another conventional integrated circuit 200. The integrated circuit 200 includes a signal pad 110, an internal circuit 120, an ESD protection element string 230, an ESD protection element string 240, a supply voltage rail Vdd, a ground voltage rail GND, and a power clamp circuit 150. The signal pad 110, the internal circuit 120, the supply voltage rail Vdd, the ground voltage rail GND, and the power clamp circuit 150 have been described above with reference to FIG. 1. The ESD protection element string 230 is electrically connected between the supply voltage rail Vdd and the signal pad 110. The ESD protection element string 240 is electrically connected between the signal pad 110 and the ground voltage rail GND. The ESD protection operations of the ESD protection element strings 230 and 240 and the power clamp circuit 150 as shown in FIG. 2 may be deduced from those of the diodes 130 and 140 and the power clamp circuit 150 as shown in FIG. 1, and therefore no description will be further provided hereinafter.

The ESD protection element string 230 illustrated in FIG. 2 includes diodes 231 and 232. An anode of the diode 231 (i.e., the ESD protection element) is electrically connected to the signal pad 110. A cathode of the diode 231 is electrically connected to an anode of the diode 232 (i.e., the ESD protection element). A cathode of the diode 232 is electrically connected to the supply voltage rail Vdd. The ESD protection element string 240 includes diodes 241 and 242. A cathode of the diode 241 (i.e., the ESD protection element) is electrically connected to the signal pad 110. An anode of the diode 241 is electrically connected to a cathode of the diode 242 (i.e., the ESD protection element). An anode of the diode 242 is electrically connected to the ground voltage rail GND. To simplify the explanation, it is assumed that the properties (e.g., the capacitance of the parasitic capacitor) of the diodes 231, 232, 241, and 242 are identical to those of the diodes 130 and 140 as shown in FIG. 1. The parasitic capacitor of the diode 231 and the parasitic capacitor of the diode 232 are serially connected between the supply voltage rail Vdd and the signal pad 110, such that the capacitance of the parasitic capacitor of the ESD protection element string 230 shown in FIG. 2 is less than the capacitance of the parasitic capacitor of the diode 130 shown in FIG. 1. Specifically, the capacitance of the parasitic capacitor of the ESD protection element string 230 shown in FIG. 2 is half the capacitance of the parasitic capacitor of the diode 130 shown in FIG. 1. In view of the above, the capacitance of the parasitic capacitor of the ESD protection element string 240 shown in FIG. 2 is half the capacitance of the parasitic capacitor of the diode 140 shown in FIG. 1. The FIG. 2 has been described above with reference to "Improving ESD robustness of stacked diodes with embedded SCR for RF applications in 65-nm CMOS" (C.-Y. Lin, M.-L. Fan, M.-D. Ker, L.-W. Chu, J.-C. Tseng, and M.-H. Song, in Proc. IEEE International Reliability Physics Symp., 2014).

Figure 3:
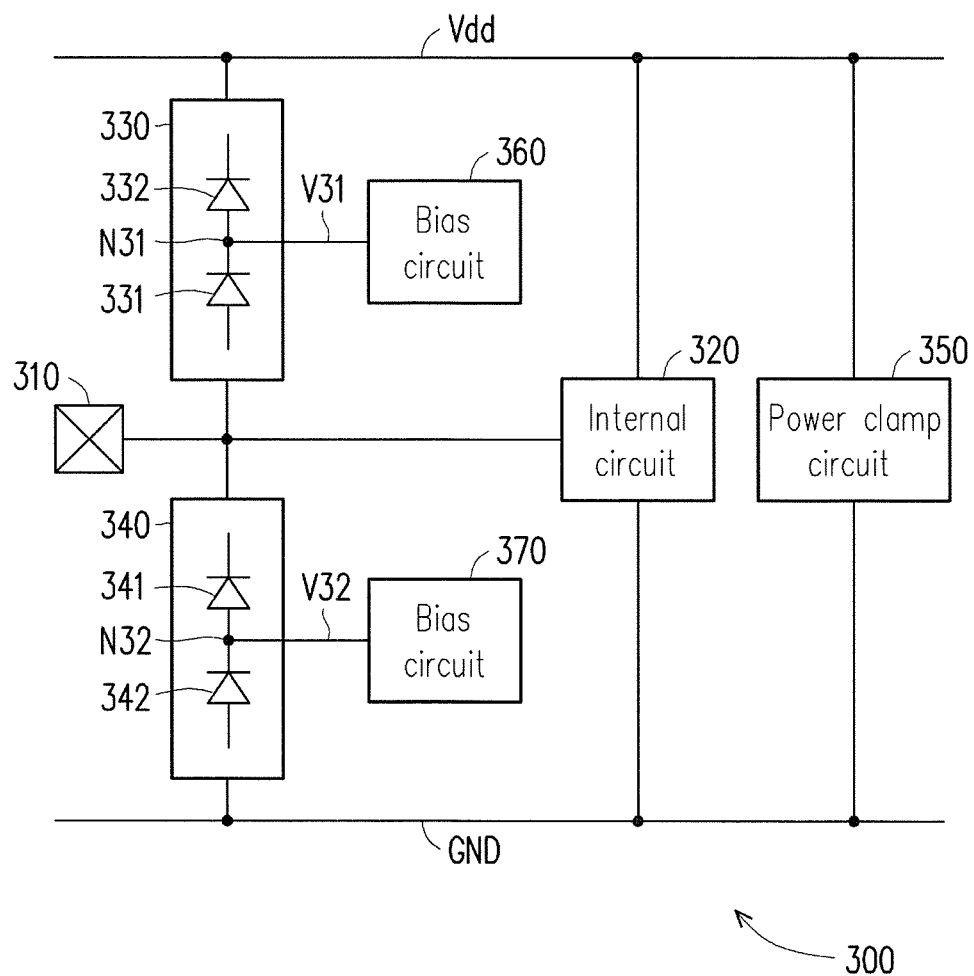
FIG. 3 is a schematic block circuit diagram of an integrated circuit according to an embodiment of the disclosure.

FIG. 3 is a schematic block circuit diagram of an integrated circuit 300 according to an embodiment of the disclosure. The integrated circuit 300 includes a signal pad 310, an internal circuit 320, an ESD protection element string 330, an ESD protection element string 340, a power clamp circuit 350, a bias circuit 360, and a bias circuit 370. Besides, the integrated circuit 300 further includes two ESD current rails, e.g., the supply voltage rail Vdd and the ground voltage rail GND shown in FIG. 3. Descriptions of the signal pad 310, the internal circuit 320, the ESD protection element string 330, the ESD protection element string 340, the supply voltage rail Vdd, the ground voltage rail GND, and the power clamp circuit 350 as shown in FIG. 3 may be deduced from the descriptions of the signal pad 110, the internal circuit 120, the diode 130, the diode 140, the supply voltage rail Vdd, the ground voltage rail GND, and the power clamp circuit 150 as shown in FIG. 1 and/or the descriptions of the signal pad 110, the internal circuit 120, the ESD protection element string 230, the ESD protection element string 240, the supply voltage rail Vdd, the ground voltage rail GND, and the power clamp circuit 150 as shown in FIG. 2, and therefore no other explanations will be further given below.

With reference to FIG. 3, a first end and a second end of the ESD protection element string 330 are electrically connected to the supply voltage rail Vdd (equivalent to one ESD current rail) and the signal pad 310, respectively. The ESD protection element string 330 includes an ESD protection element 331 and an ESD protection element 332 that are serially connected. A first end and a second end of the ESD protection element string 340 are electrically connected to the ground voltage rail GND (equivalent to the other ESD current rail) and the signal pad 310, respectively. The ESD protection element string 340 includes an ESD protection element 341 and an ESD protection element 342 that are serially connected. In the present embodiment, the ESD protection elements 331, 332, 341, and 342 may be diodes. In other embodiments of the disclosure, the ESD protection elements 331, 332, 341, and/or 342 may be silicon controlled rectifiers (SCR), transistors, or other types of ESD protection elements. The ESD protection operations of the ESD protection element strings 330 and 340 and the power clamp circuit 350 as shown in FIG. 3 may be deduced from those of the diodes 130 and 140 and the power clamp circuit 150 as shown in FIG. 1, and therefore no description will be further provided hereinafter.

The bias circuit 360 is electrically connected to the ESD protection element string 330 to provide a bias voltage V31 to a common connection node N31 between the ESD protection element 331 and the ESD protection element 332. A voltage of the common connection node N31 is assumed to be an original division voltage Vod31 when the bias circuit 360 is not electrically connected to the ESD protection element string 330. In some embodiments of the disclosure, the bias voltage V31 may be greater than the original division voltage Vod31, such that the voltage drop of the ESD protection element 331 (i.e., the voltage difference between two ends of the ESD protection element 331) may be increased during the normal operation period. In other embodiments of the disclosure, the bias voltage V31 may be less than the original division voltage Vod31, such that the voltage drop of the ESD protection element 332 (i.e., the voltage difference between two ends of the ESD protection element 332) may be increased during the normal operation period.

The bias circuit 370 is electrically connected to the ESD protection element string 340 to provide a bias voltage V32 to a common connection node N32 between the ESD protection element 341 and the ESD protection element 342. A voltage of the common connection node N32 is assumed to be an original division voltage Vod32 when the bias circuit 370 is not electrically connected to the ESD protection element string 340. In some embodiments of the disclosure, the bias voltage V32 may be greater than the original division voltage Vod32, such that the voltage drop of the ESD protection element 342 (i.e., the voltage difference between two ends of the ESD protection element 342) may be increased during the normal operation period. In other embodiments of the disclosure, the bias voltage V32 may be less than the original division voltage Vod32, such that the voltage drop of the ESD protection element 341 (i.e., the voltage difference between two ends of the ESD protection element 341) may be increased during the normal operation period.

Figure 4:
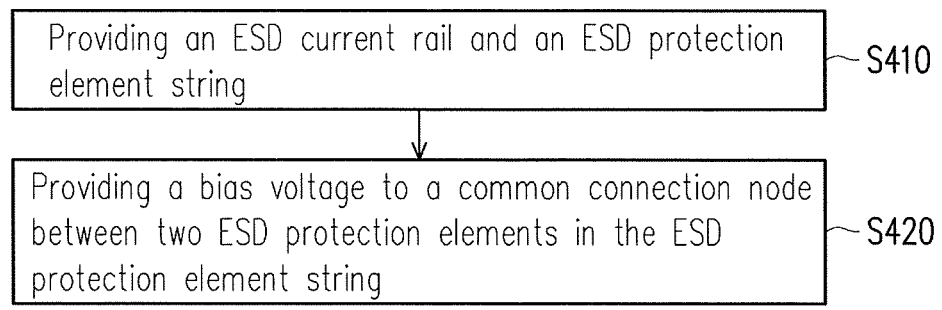
FIG. 4 is a schematic flowchart illustrating an operation method of an ESD protection device according to an embodiment of the disclosure.

FIG. 4 is a schematic flowchart illustrating an operation method of an ESD protection device according to an embodiment of the disclosure. With reference to FIG. 3 and FIG. 4, in step S410, the supply voltage rail Vdd (equivalent to one ESD current rail), the ground voltage rail GND (equivalent to the other ESD current rail), the ESD protection element string 330, and the ESD protection element string 340 are provided to the integrated circuit 300. A first end and a second end of the ESD protection element string 330 are electrically connected to the supply voltage rail Vdd and the signal pad 310, respectively, and a first end and a second end of the ESD protection element string 340 are electrically connected to the ground voltage rail GND and the signal pad 310, respectively. The ESD protection element string 330 includes the ESD protection elements 331 and 332 that are serially connected to each other; the ESD protection element string 340 includes the ESD protection elements 341 and 342 that are serially connected to each other. In step S420, the bias circuit 360 provides the bias voltage V31 to the common connection node N31 between the ESD protection elements 331 and 332, and the bias circuit 370 provides the bias voltage V32 to the common connection node N32 between the ESD protection elements 341 and 342.

Figure 5:
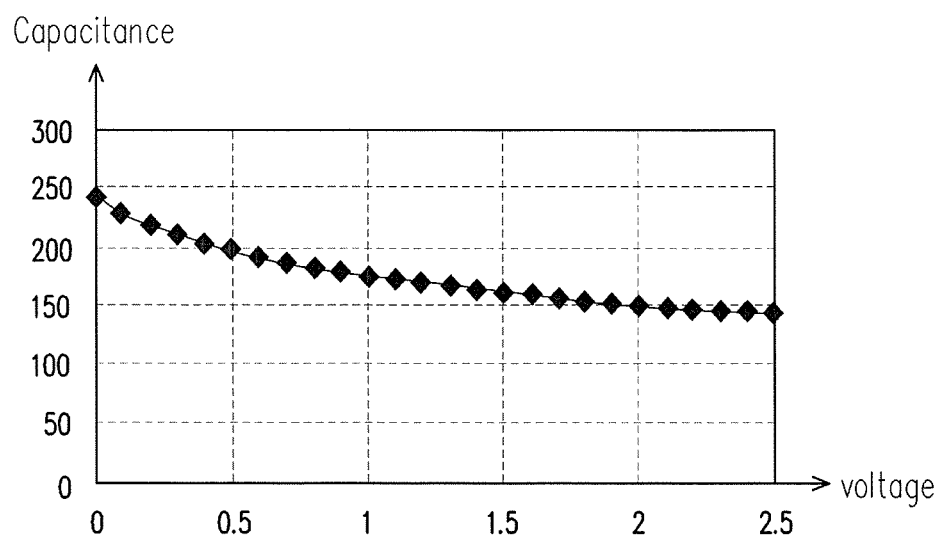
FIG. 5 is a schematic curve illustrating properties of voltage drop and parasitic capacitance of a diode.

FIG. 5 is a schematic curve illustrating properties of voltage drop and parasitic capacitance of a diode. In FIG. 5, the horizontal axis represents the voltage drop of the diode (i.e., the voltage difference between the two ends of the diode in the event that the reverse bias voltage is applied) in the unit of volts; the vertical axis represents the capacitance of the parasitic capacitor of the diode in the unit of femtofarads (fF). The numeric values on the horizontal axis and the vertical axis in FIG. 5 are merely schematic and serve as references. Due to different parameters including materials and manufacturing processes, different diodes may have different capacitances. As shown in FIG. 5, the greater the voltage drop of the diode (i.e., the ESD protection element), the smaller the capacitance of the parasitic capacitor of the diode.

With reference to FIG. 3, the bias voltage V31 changes the voltage level of the common connection node N31 and further increases the voltage drop of the ESD protection element 331 or the voltage drop of the ESD protection element 332 (i.e., the voltage difference between the two ends of the diode in the event that the reverse bias voltage is given). The greater the voltage drop of the diode (i.e., the ESD protection element), the smaller the capacitance of the parasitic capacitor of the diode. Accordingly, the capacitance of the parasitic capacitor of the ESD protection element string 330 may be reduced. Similarly, the bias voltage V32 changes the voltage level of the common connection node N32 and further increases the voltage drop of the ESD protection element 341 or the voltage drop of the ESD protection element 342 (i.e., the voltage difference between the two ends of the diode in the event that the reverse bias voltage is given), such that the capacitance of the parasitic capacitor of the ESD protection element string 340 may be reduced. The reduction of the capacitances of the parasitic capacitors of the ESD protection element strings 330 and 340 is conducive to the transmission of high-frequency signals by the signal pad 310.

Figure 6:
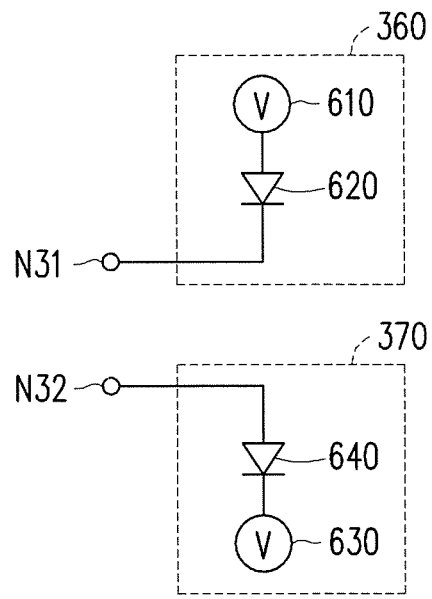
FIG. 6 is a schematic circuit diagram of the bias circuit as depicted in FIG. 3 according to an embodiment of the disclosure.

FIG. 6 is a schematic circuit diagram of the bias circuits 360 and 370 as depicted in FIG. 3 according to an embodiment of the disclosure. With reference to FIG. 3 and FIG. 6, the bias circuit 360 includes a voltage source 610 and a diode 620. An anode of the diode 620 is electrically connected to the voltage source 610, and a cathode of the diode 620 is electrically connected to the common connection node N31 of the ESD protection element string 330. In the present embodiment, the voltage source 610 may be the supply voltage rail Vdd (equivalent to one ESD current rail). The bias circuit 370 includes a voltage source 630 and a diode 640. A cathode of the diode 640 is electrically connected to the voltage source 630, and an anode of the diode 640 is electrically connected to the common connection node N32 of the ESD protection element string 340. In the present embodiment, the voltage source 630 may be the ground voltage rail GND (equivalent to the other ESD current rail).

Figure 7:
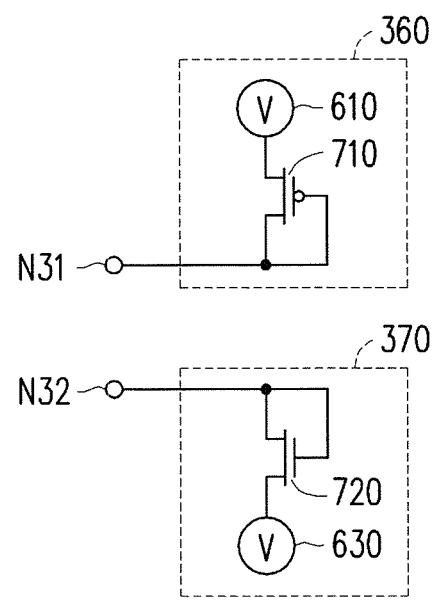
FIG. 7 is a schematic circuit diagram of the bias circuit as depicted in FIG. 3 according to another embodiment of the disclosure.

FIG. 7 is a schematic circuit diagram of the bias circuits 360 and 370 as depicted in FIG. 3 according to another embodiment of the disclosure. With reference to FIG. 3 and FIG. 7, the bias circuit 360 includes a voltage source 610 and a p-type transistor 710. A source of the p-type transistor 710 is electrically connected to the voltage source 610, and a gate and a drain of the p-type transistor 710 are electrically connected to the common connection node N31 of the ESD protection element string 330. In the present embodiment, the voltage source 610 may be the supply voltage rail Vdd. The bias circuit 370 includes a voltage source 610 and an n-type transistor 720. A source of the n-type transistor 720 is electrically connected to the voltage source 630, and a gate and a drain of the n-type transistor 720 are electrically connected to the common connection node N32 of the ESD protection element string 340. In the present embodiment, the voltage source 630 may be the ground voltage rail GND.

Figure 8:
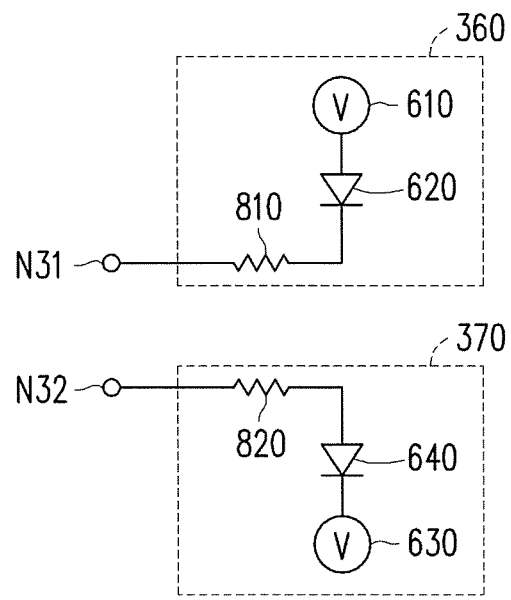
FIG. 8 is a schematic circuit diagram of the bias circuit as depicted in FIG. 3 according to still another embodiment of the disclosure.

FIG. 8 is a schematic circuit diagram of the bias circuits 360 and 370 as depicted in FIG. 3 according to still another embodiment of the disclosure. With reference to FIG. 3 and FIG. 8, the bias circuit 360 includes a voltage source 610, a diode 620, and a resistor 810. An anode of the diode 620 is electrically connected to the voltage source 610. In the present embodiment, the voltage source 610 may be the supply voltage rail Vdd. A first end and a second end of the resistor 810 are electrically connected to a cathode of the diode 620 and the common connection node N31 of the ESD protection element string 330, respectively. The bias circuit 370 includes a voltage source 630, a diode 640, and a resistor 820. A cathode of the diode 640 is electrically connected to the voltage source 630. In the present embodiment, the voltage source 630 may be the ground voltage rail GND. A first end and a second end of the resistor 820 are electrically connected to an anode of the diode 640 and the common connection node N32 of the ESD protection element string 340, respectively.

Figure 9:
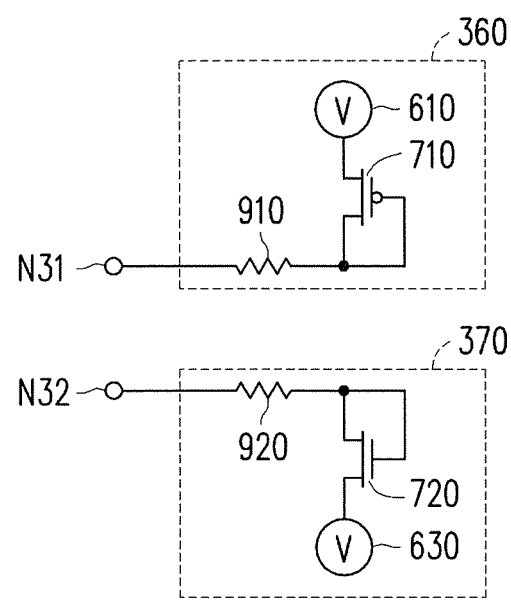
FIG. 9 is a schematic circuit diagram of the bias circuit as depicted in FIG. 3 according to still another embodiment of the disclosure.

FIG. 9 is a schematic circuit diagram of the bias circuits 360 and 370 as depicted in FIG. 3 according to still another embodiment of the disclosure. With reference to FIG. 3 and FIG. 9, the bias circuit 360 includes a voltage source 610, a p-type transistor 710, and a resistor 910. A source of the p-type transistor 710 is electrically connected to the voltage source 610. In the present embodiment, the voltage source 610 may be the supply voltage rail Vdd. A first end of the resistor 910 is electrically connected to a gate and a drain of the p-type transistor 710. A second end of the resistor 910 is electrically connected to the common connection node N31 of the ESD protection element string 330. The bias circuit 370 includes a voltage source 630, an n-type transistor 720, and a resistor 920. A source of the n-type transistor 720 is electrically connected to the voltage source 630. In the present embodiment, the voltage source 630 may be the ground voltage rail GND. A first end of the resistor 920 is electrically connected to a gate and a drain of the n-type transistor 720. A second end of the resistor 920 is electrically connected to the common connection node N32 of the ESD protection element string 340.

Figure 10:
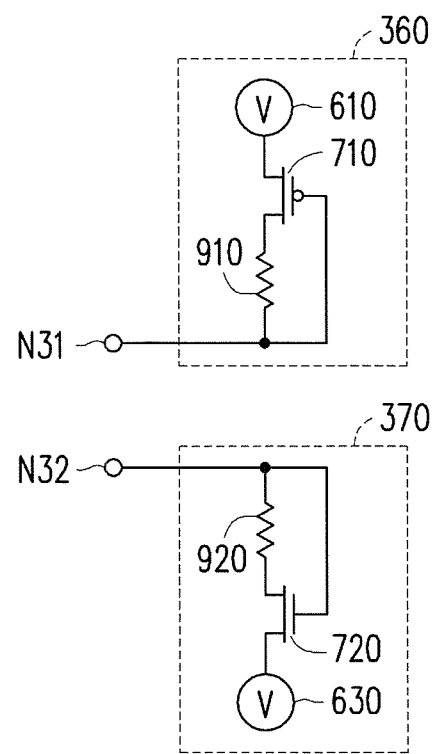
FIG. 10 is a schematic circuit diagram of the bias circuit as depicted in FIG. 3 according to still another embodiment of the disclosure.

FIG. 10 is a schematic circuit diagram of the bias circuits 360 and 370 as depicted in FIG. 3 according to still another embodiment of the disclosure. With reference to FIG. 3 and FIG. 10, the bias circuit 360 includes a voltage source 610, a p-type transistor 710, and a resistor 910. A source of the p-type transistor 710 is electrically connected to the voltage source 610. In the present embodiment, the voltage source 610 may be the supply voltage rail Vdd. A first end of the resistor 910 is electrically connected to a drain of the p-type transistor 710. A second end of the resistor 910 is electrically connected to the common connection node N31 of the ESD protection element string 330 and a gate of the p-type transistor 710. The bias circuit 370 includes a voltage source 630, an n-type transistor 720, and a resistor 920. A source of the n-type transistor 720 is electrically connected to the voltage source 630. In the present embodiment, the voltage source 630 may be the ground voltage rail GND. A first end of the resistor 920 is electrically connected to a drain of the n-type transistor 720. A second end of the resistor 920 is electrically connected to the common connection node N32 of the ESD protection element string 340 and a gate of the n-type transistor 720.

Figure 11:
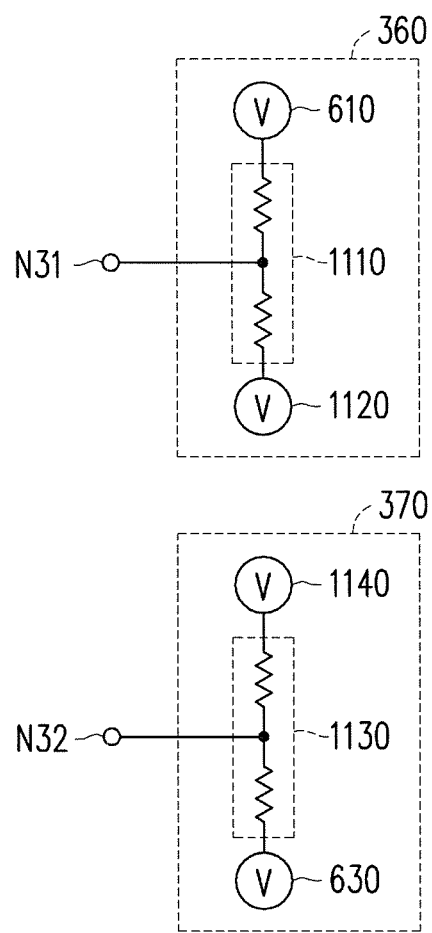
FIG. 11 is a schematic circuit diagram of the bias circuit as depicted in FIG. 3 according to another embodiment of the disclosure.

FIG. 11 is a schematic circuit diagram of the bias circuits 360 and 370 as depicted in FIG. 3 according to another embodiment of the disclosure. With reference to FIG. 3 and FIG. 10, the bias circuit 360 includes a voltage source 610, a resister string 1110, and a voltage source 1120. A first end of the resistor string 1110 is electrically connected to the voltage source 610. In the present embodiment, the voltage source 610 may be the supply voltage rail Vdd. A second end of the resistor string 1110 is electrically connected to the voltage source 1120. In the present embodiment, the voltage source 1120 may provide a reference voltage (e.g., a ground voltage). A voltage-dividing node of the resistor string 1110 is electrically connected to the common connection node N31 of the ESD protection element string 330. The bias circuit 370 includes a voltage source 630, a resistor string 1130, and a voltage source 1140. A first end of the resistor string 1130 is electrically connected to the voltage source 630. In the present embodiment, the voltage source 630 may be the ground voltage rail GND. A second end of the resistor string 1130 is electrically connected to the voltage source 1140. In the present embodiment, the voltage source 1140 may provide a system voltage. A voltage-dividing node of the resistor string 1130 is electrically connected to the common connection node N32 of the ESD protection element string 340.

Figure 12:
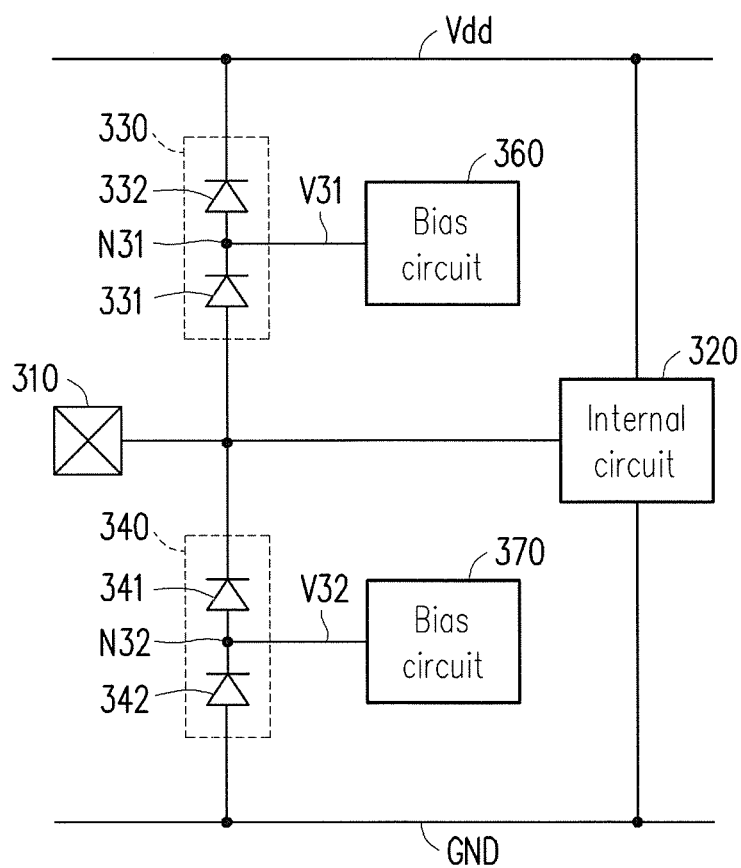
FIG. 12 is a schematic circuit diagram of the ESD protection element string as depicted in FIG. 3 according to an embodiment of the disclosure.

FIG. 12 is a schematic circuit diagram of the ESD protection element strings 330 and 340 as depicted in FIG. 3 according to an embodiment of the disclosure. The ESD protection element string 330 includes ESD protection elements 331 and 332. An anode of the ESD protection element 331 is electrically connected to the signal pad 310. A cathode of the ESD protection element 331 and an anode of the ESD protection element 332 are electrically connected to the common connection node N31. A cathode of the ESD protection element 332 is electrically connected to the ESD current rail (e.g., the supply voltage rail Vdd). The ESD protection element string 340 includes ESD protection elements 341 and 342. A cathode of the ESD protection element 341 is electrically connected to the signal pad 310. An anode of the ESD protection element 341 and a cathode of the ESD protection element 342 are electrically connected to the common connection node N32. An anode of the ESD protection element 342 is electrically connected to the ESD current rail (e.g., the ground voltage rail GND).

Figure 13:
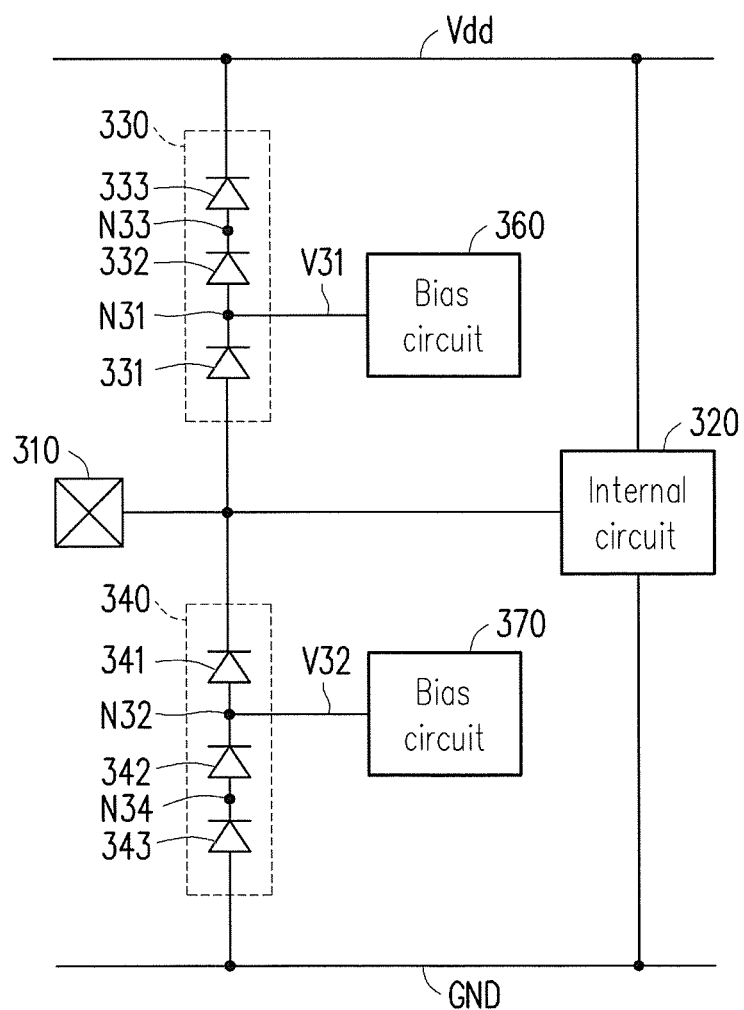
FIG. 13 is a schematic circuit diagram of the ESD protection element string as depicted in FIG. 3 according to another embodiment of the disclosure.

FIG. 13 is a schematic circuit diagram of the ESD protection element strings 330 and 340 as depicted in FIG. 3 according to another embodiment of the disclosure. The ESD protection element string 330 includes ESD protection elements 331, 332, and 333. In the present embodiment, the ESD protection elements 331, 332, and 333 may be diodes. An anode of the ESD protection element 331 is electrically connected to the signal pad 310. A cathode of the ESD protection element 331 and an anode of the ESD protection element 332 are electrically connected to the common connection node N31. A cathode of the ESD protection element 332 and an anode of the ESD protection element 333 are electrically connected to the common connection node N33. A cathode of the ESD protection element 333 is electrically connected to the ESD current rail (e.g., the supply voltage rail Vdd). The ESD protection element string 340 includes ESD protection elements 341, 342, and 343. In the present embodiment, the ESD protection elements 341, 342, and 343 may be diodes. A cathode of the ESD protection element 341 is electrically connected to the signal pad 310. An anode of the ESD protection element 341 and a cathode of the ESD protection element 342 are electrically connected to the common connection node N32. An anode of the ESD protection element 342 and a cathode of the ESD protection element 343 are electrically connected to the common connection node N34. An anode of the ESD protection element 343 is electrically connected to the ESD current rail (e.g., the ground voltage rail GND).

Figure 14:
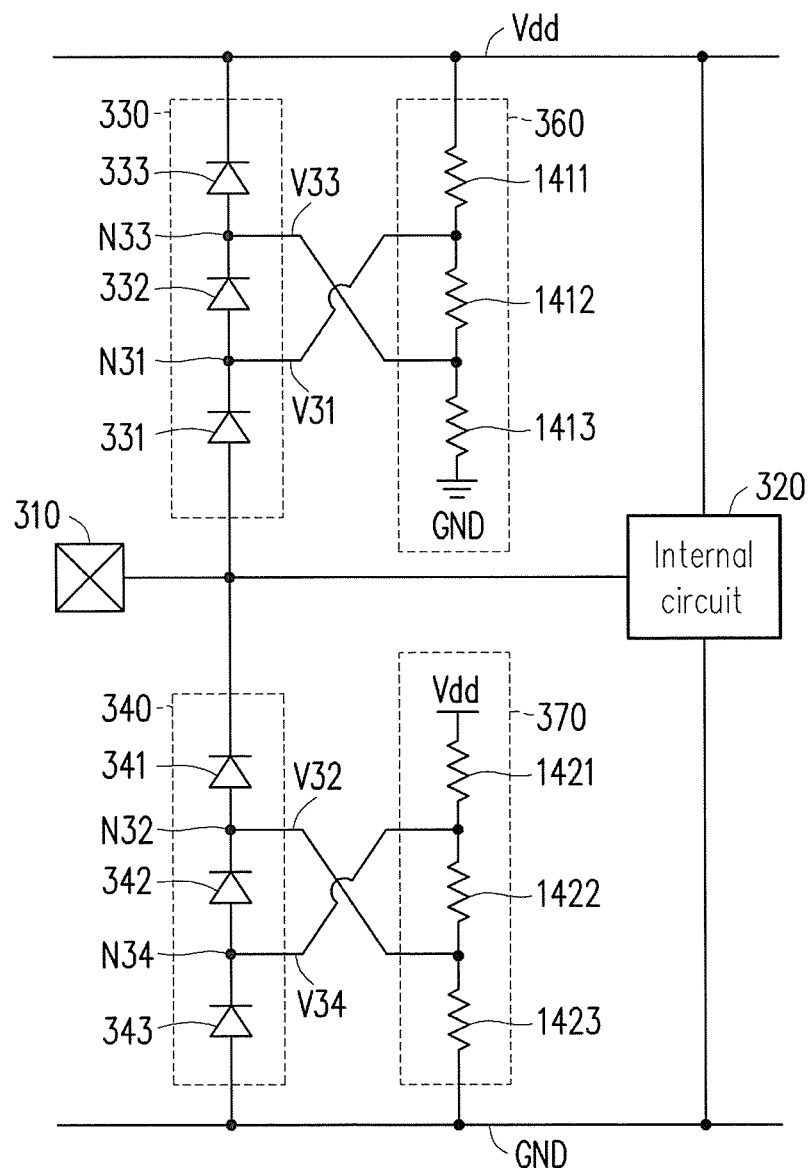
FIG. 14 is a schematic circuit diagram of the bias circuit as depicted in FIG. 13 according to an embodiment of the disclosure.

FIG. 14 is a schematic circuit diagram of the bias circuits 360 and 370 as depicted in FIG. 13 according to an embodiment of the disclosure. The bias circuit 360 includes resistors 1411, 1412, and 1413. A first end and a second end of the resistor 1411 are electrically connected to the supply voltage rail Vdd and the common connection node N31, respectively. A first end and a second end of the resistor 1412 are electrically connected to the second end of the resistor 1411 and the common connection node N33, respectively. A first end and a second end of the resistor 1413 are electrically connected to the second end of the resistor 1412 and the ground voltage rail GND, respectively. Through setting the ratio of the resistances of the resistors 1411, 1412, and 1413, the bias circuit 360 is capable of changing the bias voltage V31 of the common connection node N31 and the bias voltage V33 of the common connection node N33. A voltage of the common connection node N31 is assumed to be an original division voltage Vod31 when the bias circuit 360 is not electrically connected to the ESD protection element string 330, and a voltage of the common connection node N33 is assumed to be an original division voltage Vod33 when the bias circuit 360 is not electrically connected to the ESD protection element string 330. The bias circuit 360 is able to provide the bias voltage V31 to the common connection node N31 and the bias voltage V33 to the common connection node N33. Through setting the ratio of the resistances of the resistors 1411, 1412, and 1413, the bias voltage V31 may be greater than the original division voltage Vod31, and the bias voltage V33 may be less than the original division voltage Vod33. The increase in the voltage drop of the ESD protection element 331 and the increase in the voltage drop of the ESD protection element 333 lead to the reduction of the capacitance of the parasitic capacitor of the ESD protection element string 330.

With reference to FIG. 14, the bias circuit 370 includes resistors 1421, 1422, and 1423. A first end and a second end of the resistor 1421 are electrically connected to the supply voltage rail Vdd and the common connection node N34, respectively. A first end and a second end of the resistor 1422 are electrically connected to the second end of the resistor 1421 and the common connection node N32, respectively. A first end and a second end of the resistor 1423 are electrically connected to the second end of the resistor 1422 and the ground voltage rail GND, respectively. Through setting the ratio of the resistances of the resistors 1421, 1422, and 1423, the bias circuit 370 is capable of changing the bias voltage V32 of the common connection node N32 and the bias voltage V34 of the common connection node N34. A voltage of the common connection node N32 is assumed to be an original division voltage Vod32 when the bias circuit 370 is not electrically connected to the ESD protection element string 340, and a voltage of the common connection node N34 is assumed to be an original division voltage Vod34 when the bias circuit 370 is not electrically connected to the ESD protection element string 340. The bias circuit 370 is able to provide the bias voltage V32 to the common connection node N32 and the bias voltage V34 to the common connection node N34. Through setting the ratio of the resistances of the resistors 1421, 1422, and 1423, the bias voltage V32 may be less than the original division voltage Vod32, and the bias voltage V34 may be greater than the original division voltage Vod34. The increase in the voltage drop of the ESD protection element 341 and the increase in the voltage drop of the ESD protection element 343 lead to the reduction of the capacitance of the parasitic capacitor of the ESD protection element string 340.

Figure 15:
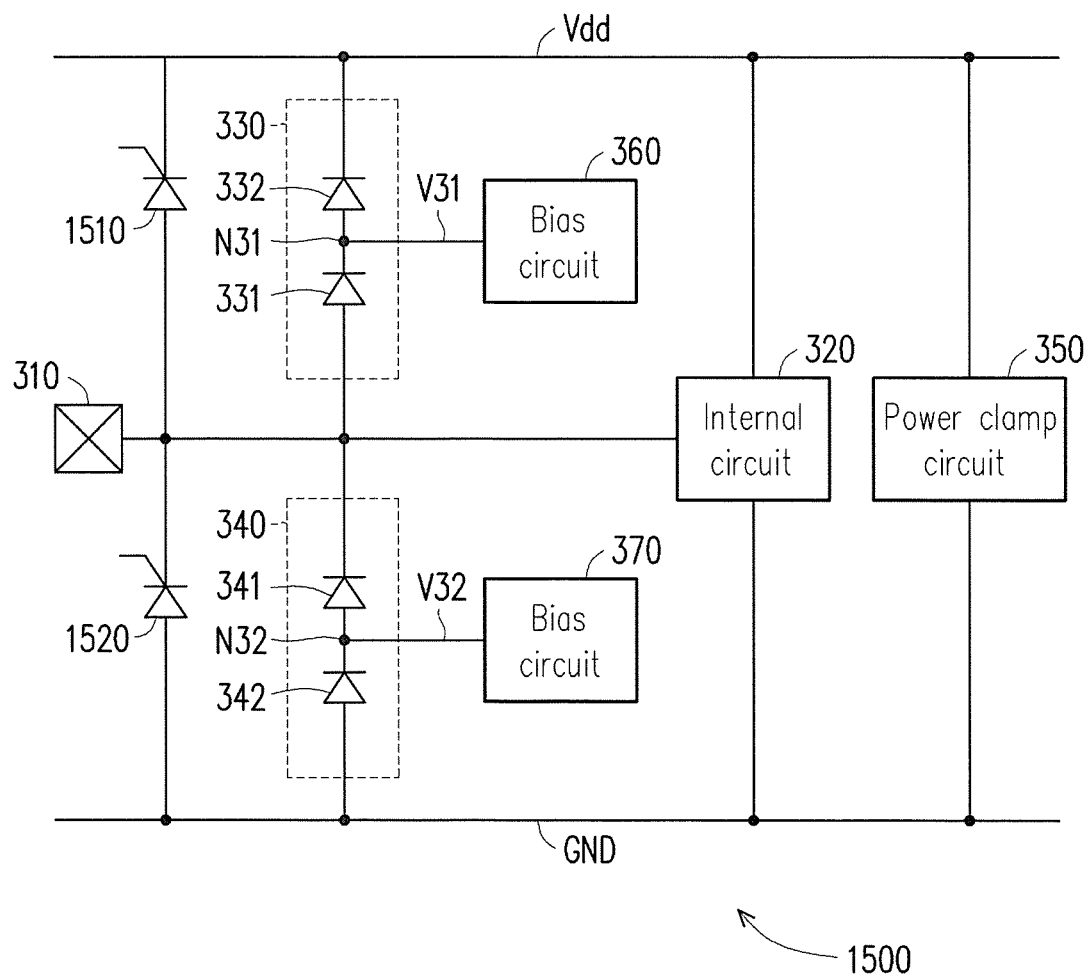
FIG. 15 is a schematic block circuit diagram of an integrated circuit according to another embodiment of the disclosure.

FIG. 15 is a schematic block circuit diagram of an integrated circuit 1500 according to another embodiment of the disclosure. The integrated circuit 1500 includes a signal pad 310, an internal circuit 320, an ESD protection element string 330, an ESD protection element string 340, a power clamp circuit 350, a bias circuit 360, a bias circuit 370, an SCR 1510, and an SCR 1520. The descriptions of the signal pad 310, the internal circuit 320, the ESD protection element string 330, the ESD protection element string 340, the power clamp circuit 350, the bias circuit 360, and the bias circuit 370 as shown in FIG. 15 may be deduced from the descriptions illustrated in FIG. 3 to FIG. 14 and thus will not be further provided. A cathode of the SCR 1510 is electrically connected to the ESD current rail (e.g., the supply voltage rail Vdd). An anode of the SCR 1510 is electrically connected to the signal pad 310. A cathode of the SCR 1520 is electrically connected to the signal pad 310. An anode of the SCR 1520 is electrically connected to the ESD current rail (e.g., the ground voltage rail GND).

In other embodiments of this disclosure, the SCR 1510 could be formed by two diodes connected in series, just as a parasitic device of the ESD protection element string 330. The SCR 1520 could be formed by two diodes connected in series, just as a parasitic device of the ESD protection element string 340. The internal node of SCR 1510 is N31 which is electrically connected to bias circuit 360. And the internal node of SCR 1520 is N32 which is electrically connected to bias circuit 370.

Figure 16:
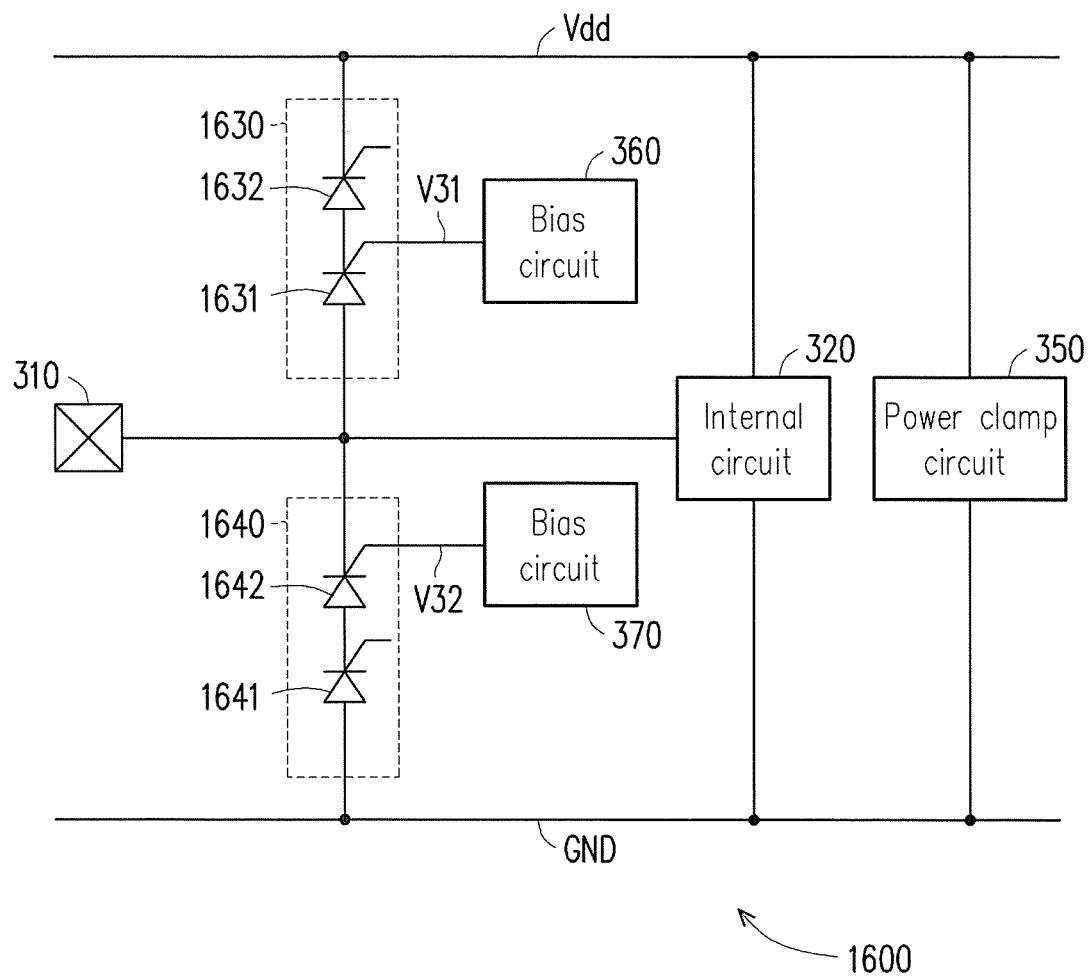
FIG. 16 is a schematic block circuit diagram of an integrated circuit according to still another embodiment of the disclosure.

FIG. 16 is a schematic block circuit diagram of an integrated circuit 1600 according to still another embodiment of the disclosure. The integrated circuit 1600 includes a signal pad 310, an internal circuit 320, an ESD protection element string 1630, an ESD protection element string 1640, a power clamp circuit 350, a bias circuit 360, and a bias circuit 370. The ESD protection element string 1630 includes SCR 1631 and SCR 1632. The anode node of the SCR 1631 is electrically connected to the signal pad 310, the cathode of the SCR 1631 is electrically connected to the anode of the SCR 1632. The gate node of the SCR 1631 is electrically connected to bias circuit 360. The cathode of the SCR 1632 is electrically connected to the ESD current rail (e.g., the supply power rail Vdd). The ESD protection element string 1640 includes SCR 1641 and SCR 1642. The cathode node of the SCR 1642 is electrically connected to the signal pad 310, the anode of the SCR 1642 is electrically connected to the cathode of the SCR 1641. The gate node of the SCR 1642 is electrically connected to bias circuit 370. The anode of SCR 1641 is electrically connected to the ESD current rail (e.g., the ground voltage rail GND). The descriptions of the signal pad 310, the internal circuit 320, the power clamp circuit 350, the bias circuit 360, and the bias circuit 370 as shown in FIG. 16 may be deduced from the descriptions of the signal pad 310, the internal circuit 320, the power clamp circuit 350, the bias circuit 360, and the bias circuit 370 as illustrated in FIG. 3 to FIG. 14 and thus will not be further provided.

Figure 17:
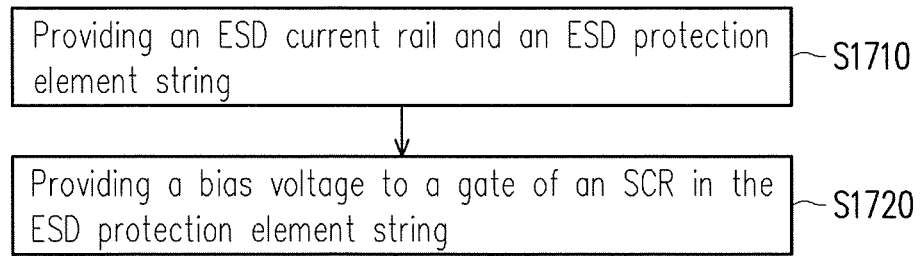
FIG. 17 is a schematic flowchart illustrating an operation method of an ESD protection device according to another embodiment of the disclosure.

FIG. 17 is a schematic flowchart illustrating an operation method of an ESD protection device according to another embodiment of the disclosure. With reference to FIG. 16 and FIG. 17, in step S1710, the supply voltage rail Vdd (equivalent to one ESD current rail), the ground voltage rail GND (equivalent to the other ESD current rail), the ESD protection element string 1630, and the ESD protection element string 1640 are provided to the integrated circuit 1600. According to the embodiment shown in FIG. 16, a first end and a second end of the ESD protection element string 1630 are electrically connected to the ESD current rail (e.g., the supply voltage rail Vdd) and the signal pad 310, respectively. A first end and a second end of the ESD protection element string 1640 are electrically connected to the ESD current rail (e.g., the ground voltage rail GND) and the signal pad 310, respectively.

The ESD protection element string 1630 includes an SCR 1631 and an SCR 1632 that are serially connected. The bias circuit 360 is electrically connected to a gate of the SCR 1631. An anode of the SCR 1631 is electrically connected to the signal pad 310. A cathode of the SCR 1631 is electrically connected to an anode of the SCR 1632. A cathode of the SCR 1632 is electrically connected to the ESD current rail (e.g., the supply voltage rail Vdd). The ESD protection element string 1640 includes an SCR 1641 and an SCR 1642 that are serially connected. The bias circuit 370 is electrically connected to a gate of the SCR 1642. An anode of the SCR 1641 is electrically connected to the ESD current rail (e.g., the ground voltage rail GND). A cathode of the SCR 1641 is electrically connected to an anode of the SCR 1642. A cathode of the SCR 1642 is electrically connected to the signal pad 310.

A voltage of the gate of the SCR 1631 is assumed to be an original division voltage Vod161 when the bias circuit 360 is not electrically connected to the ESD protection element strings 1630 and 1640, and a voltage of the gate of the SCR 1642 is assumed to be an original division voltage Vod162 when the bias circuits 360 and 370 are not electrically connected to the ESD protection element strings 1630 and 1640. In step S1720, the bias circuit 360 provides the bias voltage V31 to the gate of the SCR 1631, and the bias circuit 370 provides the bias voltage V32 to the gate of the SCR 1642. In some embodiments of the disclosure, the bias voltage V31 is greater than the original division voltage Vod161, and the bias voltage V32 is less than the original division voltage Vod162.

To sum up, in the embodiments of the disclosure, the ESD protection device and the operation method thereof allow an increase in the voltage drop of at least one ESD protection element in the ESD protection element string (i.e., the voltage difference between two ends of the at least one ESD protection element). The greater the voltage drop of the ESD protection element, the smaller the capacitance of the parasitic capacitor of the ESD protection element. Hence, as provided in the embodiments of the disclosure, the ESD protection device and the operation method thereof may be applied to reduce the capacitance of the parasitic capacitor of the ESD protection element string. The reduction of the capacitance of the parasitic capacitor of the ESD protection element string is conducive to the transmission of the high-frequency signals by the signal pad.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electrostatic discharge (ESD) protection device comprising:
   a first ESD current rail;
   a first ESD protection element string, a first end and a second end of the first ESD protection element string being electrically connected to the first ESD current rail and a signal pad, respectively, wherein the first ESD protection element string comprises a first ESD protection element and a second ESD protection element serially connected to each other, and the first ESD protection element is electrically connected to the signal pad; and
   a first bias circuit electrically connected to the first ESD protection element string to provide a first bias voltage to a first common connection node between the first ESD protection element and the second ESD protection element, wherein the first bias circuit provides the first bias voltage to increase a voltage drop of the first ESD protection element in the first ESD protection element string in order to reduce a parasitic capacitance of the first ESD protection element string,
   wherein the first bias voltage is in the range between an original division voltage and a voltage of the first ESD current rail in normal operation, and the original division voltage is a voltage of the first common connection node when the first bias voltage is zero.

2. The ESD protection device of claim 1, wherein the first ESD current rail is a supply voltage rail or a ground voltage rail.

3. The ESD protection device of claim 1, wherein an anode of the first ESD protection element is electrically connected to the signal pad, a cathode of the first ESD protection element and an anode of the second ESD protection element are electrically connected to the first common connection node, and a cathode of the second ESD protection element is electrically connected to the first ESD current rail.

4. The ESD protection device of claim 3, wherein the first bias voltage is greater than an original division voltage, and the original division voltage is a voltage of the first common connection node when the first bias circuit is not electrically connected to the first ESD protection element string.

5. The ESD protection device of claim 1, wherein a cathode of the first ESD protection element is electrically connected to the signal pad, an anode of the first ESD protection element and a cathode of the second ESD protection element are electrically connected to the first common connection node, and an anode of the second ESD protection element is electrically connected to the first ESD current rail.

6. The ESD protection device of claim 5, wherein the first bias voltage is less than an original division voltage, and the original division voltage is a voltage of the first common connection node when the first bias circuit is not electrically connected to the first ESD protection element string.

7. The ESD protection device of claim 1, wherein the first ESD protection element string further comprises a third ESD protection element serially connected to the first ESD protection element and the second ESD protection element, an anode of the first ESD protection element is electrically connected to the signal pad, a cathode of the first ESD protection element and an anode of the second ESD protection element are electrically connected to the first common connection node, a cathode of the second ESD protection element and an anode of the third ESD protection element are electrically connected to a second common connection node, and a cathode of the third ESD protection element is electrically connected to the first ESD current rail.

8. The ESD protection device of claim 7, wherein the first bias circuit further provides a second bias voltage to the second common connection node, the first bias voltage is greater than a first original division voltage, the second bias voltage is less than a second original division voltage, the first original division voltage is a voltage of the first common connection node when the first bias circuit is not electrically connected to the first ESD protection element string, and the second original division voltage is a voltage of the second common connection node when the first bias circuit is not electrically connected to the first ESD protection element string.

9. The ESD protection device of claim 1, wherein the first ESD protection element string further comprises a third ESD protection element serially connected to the first ESD protection element and the second ESD protection element, a cathode of the first ESD protection element is electrically connected to the signal pad, an anode of the first ESD protection element and a cathode of the second ESD protection element are electrically connected to the first common connection node, an anode of the second ESD protection element and a cathode of the third ESD protection element are electrically connected to a second common connection node, and an anode of the third ESD protection element is electrically connected to the first ESD current rail.

10. The ESD protection device of claim 9, wherein the first bias circuit further provides a second bias voltage to the second common connection node, the first bias voltage is less than a first original division voltage, and the second bias voltage is greater than a second original division voltage, the first original division voltage is a voltage of the first common connection node when the first bias circuit is not electrically connected to the first ESD protection element string, and the second original division voltage is a voltage of the second common connection node when the first bias circuit is not electrically connected to the first ESD protection element string.

11. The ESD protection device of claim 1, wherein the first bias circuit comprises:
a diode, an anode of the diode being electrically connected to the first ESD current rail, a cathode of the diode being electrically connected to the first common connection node.

12. The ESD protection device of claim 1, wherein the first bias circuit comprises:
a p-type transistor, a source of the p-type transistor being electrically connected to the first ESD current rail, a gate and a drain of the p-type transistor being electrically connected to the first common connection node.

13. The ESD protection device of claim 1, wherein the first bias circuit comprises:
a diode, an anode of the diode being electrically connected to the first ESD current rail; and
a resistor, a first end and a second end of the resistor being electrically connected to a cathode of the diode and the first common connection node, respectively.

14. The ESD protection device of claim 1, wherein the first bias circuit comprises:
a p-type transistor, a source of the p-type transistor being electrically connected to the first ESD current rail; and
a resistor, a first end of the resistor being electrically connected to a gate and a drain of the p-type transistor, a second end of the resistor being electrically connected to the first common connection node.

15. The ESD protection device of claim 1, wherein the first bias circuit comprises:
a p-type transistor, a source of the p-type transistor being electrically connected to the first ESD current rail; and
a resistor, a first end of the resistor being electrically connected to a drain of the p-type transistor, a second end of the resistor being electrically connected to the first common connection node and a gate of the p-type transistor.

16. The ESD protection device of claim 1, wherein the first bias circuit comprises:
a resistor string, a first end and a second end of the resistor string being electrically connected to the first ESD current rail and a reference voltage, respectively, a voltage-dividing node of the resistor string being electrically connected to the first common connection node.

17. The ESD protection device of claim 1, wherein the first bias circuit comprises:
a diode, a cathode of the diode being electrically connected to the first ESD current rail, an anode of the diode being electrically connected to the first common connection node.

18. The ESD protection device of claim 1, wherein the first bias circuit comprises:
an n-type transistor, a source of the n-type transistor being electrically connected to the first ESD current rail, a gate and a drain of the n-type transistor being electrically connected to the first common connection node.

19. The ESD protection device of claim 1, wherein the first bias circuit comprises:
- a diode, a cathode of the diode being electrically connected to the first ESD current rail; and
- a resistor, a first end and a second end of the resistor being electrically connected to an anode of the diode and the first common connection node, respectively.

20. The ESD protection device of claim 1, wherein the first bias circuit comprises:
- an n-type transistor, a source of the n-type transistor being electrically connected to the first ESD current rail; and
- a resistor, a first end of the resistor being electrically connected to a gate and a drain of the n-type transistor, a second end of the resistor being electrically connected to the first common connection node.

21. The ESD protection device of claim 1, wherein the first bias circuit comprises:
- an n-type transistor, a source of the n-type transistor being electrically connected to the first ESD current rail; and
- a resistor, a first end of the resistor being electrically connected to a drain of the n-type transistor, a second end of the resistor being electrically connected to the first common connection node and a gate of the n-type transistor.

22. The ESD protection device of claim 1, wherein the first bias circuit comprises:
- a resistor string, a first end and a second end of the resistor string being electrically connected to the first ESD current rail and a system voltage, respectively, a voltage-dividing node of the resistor string being electrically connected to the first common connection node.

23. The ESD protection device of claim 1, further comprising:
- a second ESD current rail;
- a second ESD protection element string, a first end and a second end of the second ESD protection element string being electrically connected to the second ESD current rail and the signal pad, respectively, wherein the second ESD protection element string comprises a third ESD protection element and a fourth ESD protection element serially connected to each other; and
- a second bias circuit electrically connected to the second ESD protection element string to provide a second bias voltage to a second common connection node between the third ESD protection element and the fourth ESD protection element.

24. The ESD protection device of claim 23, further comprising:
- a first silicon controlled rectifier, a cathode of the first silicon controlled rectifier being electrically connected to the first ESD current rail, an anode of the first silicon controlled rectifier being electrically connected to the signal pad; and
- a second silicon controlled rectifier, a cathode of the second silicon controlled rectifier being electrically connected to the signal pad, an anode of the second silicon controlled rectifier being electrically connected to the second ESD current rail.

25. An operation method of an electrostatic discharge (ESD) protection device, comprising:
- providing a first ESD current rail;
- providing a first ESD protection element string, a first end and a second end of the first ESD protection element string being electrically connected to the first ESD current rail and a signal pad, respectively, wherein the first ESD protection element string comprises a first ESD protection element and a second ESD protection element serially connected to each other, and the first ESD protection element is electrically connected to the signal pad; and
- providing, by a first bias circuit, a first bias voltage to a first common connection node between the first ESD protection element and the second ESD protection element, wherein the first bias circuit provides the first bias voltage to increase a voltage drop of the first ESD protection element in the first ESD protection element string in order to reduce a parasitic capacitance of the first ESD protection element string,
- wherein the first bias voltage is in the range between an original division voltage and a voltage of the first ESD current rail in normal operation, and the original division voltage is a voltage of the first common connection node when the first bias voltage is zero.

26. An electrostatic discharge (ESD) protection device comprising:
- a first ESD current rail;
- a first ESD protection element string, a first end and a second end of the first ESD protection element string being electrically connected to the first ESD current rail and a signal pad, respectively, wherein the first ESD protection element string comprises a first silicon controlled rectifier and a second silicon controlled rectifier serially connected to each other, and the first silicon controlled rectifier is electrically connected to the signal pad; and
- a first bias circuit electrically connected to a gate of only one of the first silicon controlled rectifier and further connected to the second silicon controlled rectifier to provide a first bias voltage, wherein the first bias circuit provides the first bias voltage to increase a voltage drop of the first silicon controlled rectifier in the first ESD protection element string in order to reduce a parasitic capacitance of the first ESD protection element string.

27. The ESD protection device of claim 26, wherein the first ESD current rail is a supply voltage rail or a ground voltage rail.

28. The ESD protection device of claim 26, wherein an anode of the first silicon controlled rectifier is electrically connected to the signal pad, a cathode of the first silicon controlled rectifier is electrically connected to an anode of the second silicon controlled rectifier, and a cathode of the second silicon controlled rectifier is electrically connected to the first ESD current rail.

29. The ESD protection device of claim 28, wherein the first bias voltage is greater than an original division voltage, and the original division voltage is a voltage of the gate of the first silicon controlled rectifier when the first bias voltage is zero.

30. The ESD protection device of claim 26, wherein a cathode of the first silicon controlled rectifier is electrically connected to the signal pad, an anode of the first silicon controlled rectifier is electrically connected to a cathode of the second silicon controlled rectifier, and an anode of the second silicon controlled rectifier is electrically connected to the first ESD current rail.

31. The ESD protection device of claim 30, wherein the first bias voltage is less than an original division voltage, and the original division voltage is a voltage of the gate of the first silicon controlled rectifier when the first bias voltage is zero.

32. The ESD protection device of claim 26, further comprising:
   a second ESD current rail;
   a second ESD protection element string, a first end and a second end of the second ESD protection element string being electrically connected to the second ESD current rail and the signal pad, respectively, wherein the second ESD protection element string comprises a third silicon controlled rectifier and a fourth silicon controlled rectifier serially connected to each other; and
   a second bias circuit electrically connected to the second ESD protection element string to provide a second bias voltage to a gate of the third silicon controlled rectifier.

33. An operation method of an electrostatic discharge (ESD) protection device, comprising:
   providing a first ESD current rail;
   providing a first ESD protection element string, a first end and a second end of the first ESD protection element string being electrically connected to the first ESD current rail and a signal pad, respectively, wherein the first ESD protection element string comprises a first silicon controlled rectifier and a second silicon controlled rectifier serially connected to each other, and the first silicon controlled rectifier is electrically connected to the signal pad; and
   providing, by a first bias circuit, a first bias voltage to a gate of only one of the first silicon controlled rectifier and further connected to the second silicon controlled rectifier, wherein the first bias circuit provides the first bias voltage to increase a voltage drop of the first silicon controlled rectifier in the first ESD protection element string in order to reduce a parasitic capacitance of the first ESD protection element string.

* * * * *